(12) United States Patent
Becker-Ross et al.

(10) Patent No.: US 8,102,527 B2
(45) Date of Patent: Jan. 24, 2012

(54) SPECTROMETER ASSEMBLY

(75) Inventors: Helmut Becker-Ross, Berlin (DE); Michael Okruss, Potsdam (DE); Stefan Florek, Berlin (DE)

(73) Assignee: Leibniz-Institut fur Analytische, Dortmund (DE)

( * ) Notice: Subject to any disclaimer, the term of this patent is extended or adjusted under 35 U.S.C. 154(b) by 0 days.

(21) Appl. No.: 12/665,665

(22) PCT Filed: May 9, 2008

(86) PCT No.: PCT/EP2008/055755
§ 371 (c)(1),
(2), (4) Date: Dec. 18, 2009

(87) PCT Pub. No.: WO2008/155169
PCT Pub. Date: Dec. 24, 2008

(65) Prior Publication Data
US 2010/0171953 A1    Jul. 8, 2010

(30) Foreign Application Priority Data
Jun. 18, 2007 (DE) .......................... 10 2007 028 505

(51) Int. Cl.
G01J 3/28 (2006.01)
(52) U.S. Cl. ...................................................... 356/328
(58) Field of Classification Search .................. 356/326, 356/328
See application file for complete search history.

(56) References Cited

U.S. PATENT DOCUMENTS
3,390,604 A    7/1968    Makabe et al.
(Continued)

FOREIGN PATENT DOCUMENTS
DE    19635046    3/1998
(Continued)

OTHER PUBLICATIONS

Berstein et al.; Mike: A Double Echelle Spectograph for the Magellan Telescopes at Las Camanas Observatory; Proc. of SPIE; pp. 1694-1704; vol. 4841.

(Continued)

Primary Examiner — Tarifur Chowdhury
Assistant Examiner — Abdullahi Nur
(74) Attorney, Agent, or Firm — Thorpe North & Western LLP

(57) ABSTRACT

The invention relates to a spectrometer arrangement (10) having a spectrometer for producing a spectrum of radiation from a radiation source on a detector (34), comprising an optical imaging Littrow arrangement (18, 20) for imaging the radiation entering the spectrometer arrangement (16) in an image plane, a first dispersion arrangement (28, 30) for the spectral decomposition of a first wavelength range of the radiation entering the spectrometer arrangement, a second dispersion arrangement (58, 60) for the spectral decomposition of a second wavelength range of the radiation entering the spectrometer arrangement, and a common detector (34) arranged in the image plane of the imagine optics, characterized in that the imaging optical arrangement (18, 20) comprises an element (20) that can be moved between two positions (20, 50), wherein the radiation entering the spectrometer arrangement in the first position is guided via the first dispersion arrangement and in the second position via the second dispersion arrangement.

12 Claims, 4 Drawing Sheets

U.S. PATENT DOCUMENTS

| | | | |
|---|---|---|---|
| 3,472,595 | A | 10/1969 | Hashizume et al. |
| 4,060,327 | A | 11/1977 | Jacobowitz et al. |
| 4,697,924 | A | 10/1987 | Akiyama |
| 5,757,483 | A | 5/1998 | Pierce, III |
| 5,973,780 | A | 10/1999 | Tsuboi et al. |
| 7,804,593 | B2 | 9/2010 | Becker-Roβ et al. |
| 2002/0180969 | A1 | 12/2002 | Becker-Ross et al. |
| 2003/0173501 | A1 | 9/2003 | Thio et al. |
| 2005/0157293 | A1* | 7/2005 | Florek et al. .................. 356/328 |
| 2008/0094626 | A1 | 4/2008 | Becker-Ross et al. |

FOREIGN PATENT DOCUMENTS

| | | |
|---|---|---|
| WO | WO 2005/121723 | 5/2008 |
| WO | WO 2008/155169 | 12/2008 |

OTHER PUBLICATIONS

N. Kappelmann et al.; The High Resolution Spectrograph for Specrum UV, Experimental Astronomy 7,1997; 361-367; 4$^{th}$ Meeting of the European Astronomical Society Held Jointly with 29$^{th}$ Meeting of the Italian Astronomical Society on Progress in European Astrophysics; New Instruments and Technologies; Sep. 25-29, 1995.
LTB Lasertechnik Berlin, Butterfly with Eagle Eye; Pressemitteilung; Jan. 25, 2005.
Zhang et al; Color Difference Computation Based on Semispherical Spectral-Reflectance Measurement; Chinese Journal of Quantum Electronics; Jun. 2004; pp. 292-294; vol. 21, No. 3 (translation of abstract on p. 294).

* cited by examiner

SPECTROMETER ASSEMBLY

TECHNICAL FIELD

The invention relates to a spectrometer assembly with a spectrometer for generating a spectrum of light emitted by a light source on a detector, comprising:
(a) an optical imaging Littrow-assembly for imaging light entering the spectrometer assembly on an image plane,
(b) a first dispersing assembly for spectral dispersion of a first wavelength range of the light entering the spectrometer assembly,
(c) a second dispersing assembly for spectral dispersion of a second wavelength range of the light entering the spectrometer assembly, and
(d) a common detector in the image plane of the optical imaging assembly.

Spectrometers serve to spectrally disperse light. An example for a spectrometer assembly where an optical imaging assembly with Littrow set-up is used is shown in the publication "Technisches Handbuch für optische Messgeräte", VEB Carl Zeiss Jena, Jena, April 1963, Publication number 32-038-1 in the Chapter "Spiegelmonochromator SPM2". A deflecting prism is mounted behind an entrance slit. The deflecting prism deflects light towards a parabolic mirror. There, the divergent light is parallelized. The parallel light bundle is reflected at the mirror out of the plane of the entrance slit towards a prism assembly and dispersed therein. A mirror reflects the dispersed light back along its incoming path and again through the prism. From there the light passes the parabolic mirror and is focused. The assembly is mounted in such a way that the dispersed light reaches the parabolic mirror slightly shifted. Thereby, it is deflected at the deflecting prism towards the exit slit.

The wavelength spectrum and its changes form a common basis in particular for analytical problems. Spectra with a high spectral resolution are obtained with Echelle spectrometers.

In Echelle spectrometers gratings are used with a stair-shaped cross-section (Echelle (French)=Stairs). Due to the stair-shaped structure with a corresponding Blaze-angle, a diffraction pattern is generated where the diffracted intensity is concentrated in high orders, such as, for example, fiftieth to hundredth order. Thereby, high spectral resolutions can be achieved with a small assembly. The order may overlap depending on the incident wavelengths. The orders are, therefore, laterally dispersed again relative to the dispersion plane in order to separate the different occurring orders. In such a way a two-dimensional spectrum is obtained which can be detected with detector arrays.

Such an Echelle spectrometer with internal separation of the orders must be distinguished from Echelle spectrometers with external separation of the orders, where only radiation from a small spectral range enters the spectrometer. With spectrometers with internal separation of the orders, the spectrum is generated on the detector in the form of a two-dimensional structure. This structure consists of parallel spectral sections having the size of one free spectral range. The use of a detector array with a plurality of detector elements enables the simultaneous detection of a large wavelength range with high resolution. The lateral dispersion is normally selected such that all orders are completely separated at all points. In order to ensure this separation over the entire spectral range, there are spectral ranges where there is an unused gap between the individual orders. In such a way larger gaps occur in the short wavelength range due to the higher diffraction index than in the long wavelength range if a prism is used for lateral dispersion. It is a disadvantage with known assemblies that detectors must be very large if large spectral ranges shall be detected with high resolution and a sufficient optical throughput. Furthermore, there are problems if the light source emits light with significantly different spectral intensities. For example, the spectral range between 193 nm and 852 nm, which is very important for spectroscopy, is covered by some light sources. The intensity above 350 nm, however, is often several orders of magnitude larger than in the spectral range around 200 nm. Normally, detectors do not have a sufficient dynamic range so that the spectral ranges can be simultaneously detected without compromising sensitivity, or without the necessity to measure the spectral ranges separately at different illumination times.

An assembly is known where the gaps between the orders are used. The spectrometer is provided with an assembly for pre-dispersion of the light entering the spectrometer. The radiation is pre-dispersed at a prism having a very small prism angle. Furthermore, an entrance slit height is chosen corresponding to the maximum width of the gap between two orders in the short wavelength range. With suitable illumination of the entrance slit light of the short wavelength range can completely enter the spectrometer. Radiation for the long wavelength range will only partly pass the entrance slit due to the pre-dispersion. Thereby, a smaller entrance slit height will become effective in ranges where the separation of the order is not quiet so large. In such a way the light transmission is increased for the short wavelength range with generally low intensity.

With such an assembly the detector surface is completely used. The size of the detector, however, will remain the same. Also, the illumination intensity of each individual detector element remains almost unchanged with such an assembly. In return, there are overall losses at the additional optical components.

A further assembly is known aiming at a better use of the detector surface by a more evenly distributed lateral dispersion. Such a more evenly distributed lateral dispersion can be achieved with two oppositely directed prisms of different materials. The overall dispersion is determined by the difference of the dispersions of the two materials. Large prism angles must be used in order to achieve a large difference. Accordingly, high transmission losses will occur with simultaneous small overall dispersion.

Furthermore, an assembly is known where a combination of a prism and a grating is used to generate a lateral dispersion. The prism has a higher dispersion in the short wavelength range and the grating has a higher dispersion in the long wavelength range. The combination will generate a more evenly distributed lateral dispersion than only one individual component. It is, however, a disadvantage of such an assembly that the various orders of the lateral dispersing grating will cause the separation of the orders to become ambiguous. There are also problems with the dynamic range of the detector if large ranges shall be simultaneously detected.

DE 10 2004 28 001 discloses a known double-Echelle spectrometer called "ARYELLE" where a second spectrometer assembly is used in addition to a first spectrometer assembly. Both spectrometer assemblies have their own individual entrance slit, their own individual dispersing assembly and their own individual optical imaging assembly. This enables the separate optimization of the optical components for different wavelength ranges. The spectrometer assemblies operate with a common detector arranged in a common imaging plane. Depending on which entrance slit is illuminated the detector will detect light from one or the other wavelength range. All components are tightly mounted. The choice of the wavelength range is externally effected by choosing the entrance slit. A chopper or the like can be used for this purpose. It is difficult and expensive to adjust such an assembly due to the high amount of optical components.

DISCLOSURE OF THE INVENTION

It is an object of the invention to provide a spectrometer assembly of the above-mentioned kind which is simpler and cheaper.

According to the present invention, this object is achieved in that the optical imaging assembly comprises an element adapted to be moved between two positions, wherein the light entering the spectrometer assembly is guided through the first dispersing assembly in the first position and through the second dispersing assembly in the second position.

Contrary to the known assemblies, there is now only one entrance slit and, if necessary, only one chopper. Accordingly the illumination of the entrance slit is simpler. The separation of the light of the two wavelength ranges is effected inside the spectrometer. The common use of the optical imaging assembly in a Littrow arrangement requires a smaller amount of optical components. Thereby, the assembly is cheaper. Only one component of the optical imaging assembly is moveable in order to pass the light beam alternatively through one or the other dispersing assembly.

Preferably, the optical imaging assembly comprises a concave mirror adapted to be moved from the first to the second position by rotation. With suitable selection of the rotational axis the concave mirror can alternatively illuminate one or the other dispersing assembly. The first dispersing assembly may be arranged outside of a plane defined by the center points of entrance slit, concave mirror and detector, and the second dispersing assembly may be arranged on the other side outside of this plane. The beam enters through the entrance slit, runs over a deflecting mirror and is, for example, upwardly deflected at the concave mirror. After dispersion the beam extends in itself apart from a small lateral shift. Due to this shift the beam runs to a different deflecting mirror in the direction of the exit slit. By rotation of the concave mirror a downward deflection can be effected to another dispersing assembly, if another wavelength range shall be measured.

Preferably, the concave mirror is an off-axis paraboloid. However, a toroidal or spherical mirror is also suitable for this purpose. An off-axis paraboloid will achieve a particularly good imaging quality.

Preferably, the off-axis rotational axis extends through the focal point of the concave mirror, where the degree of the deflecting angle between the incident and the reflected beam at one wavelength is the same in the first and the second position. Thereby, a symmetric assembly with a high imaging quality is achieved.

In a particularly preferred embodiment of the invention, the first and/or second dispersing assembly comprises an Echelle grating and a further dispersion element dispersing in a direction lateral to the dispersion direction of the Echelle grating. A high resolution, two-dimensional spectrum is generated with an Echelle-grating and a lateral dispersion. As the spectrum is detected only along a selected, i.e. limited wavelength range, a smaller detector array is sufficient for the detection.

Preferably, a detector array with a two-dimensional assembly of a plurality of detector elements is arranged in the imaging plane. Thereby, simultaneous measurement of the selected wavelength range is possible. With measurement of the environment of lines the results can be normalized and corrected for background.

Preferably, the optical properties of the elements of the dispersing assemblies are optimized with respect to the corresponding wavelength range. Such an optimization can relate to the grating constant, the blaze angle, the refracting angle of the prism, the prism material and the coating of the optical components. Additionally, the dynamic range of the detector may be adapted to the respecting wavelength range.

Modifications of the invention are subject matter of the dependent claims. An embodiment of the invention is described below in greater detail with reference to the accompanying drawings.

DESCRIPTION OF THE EMBODIMENT

Figure 1:
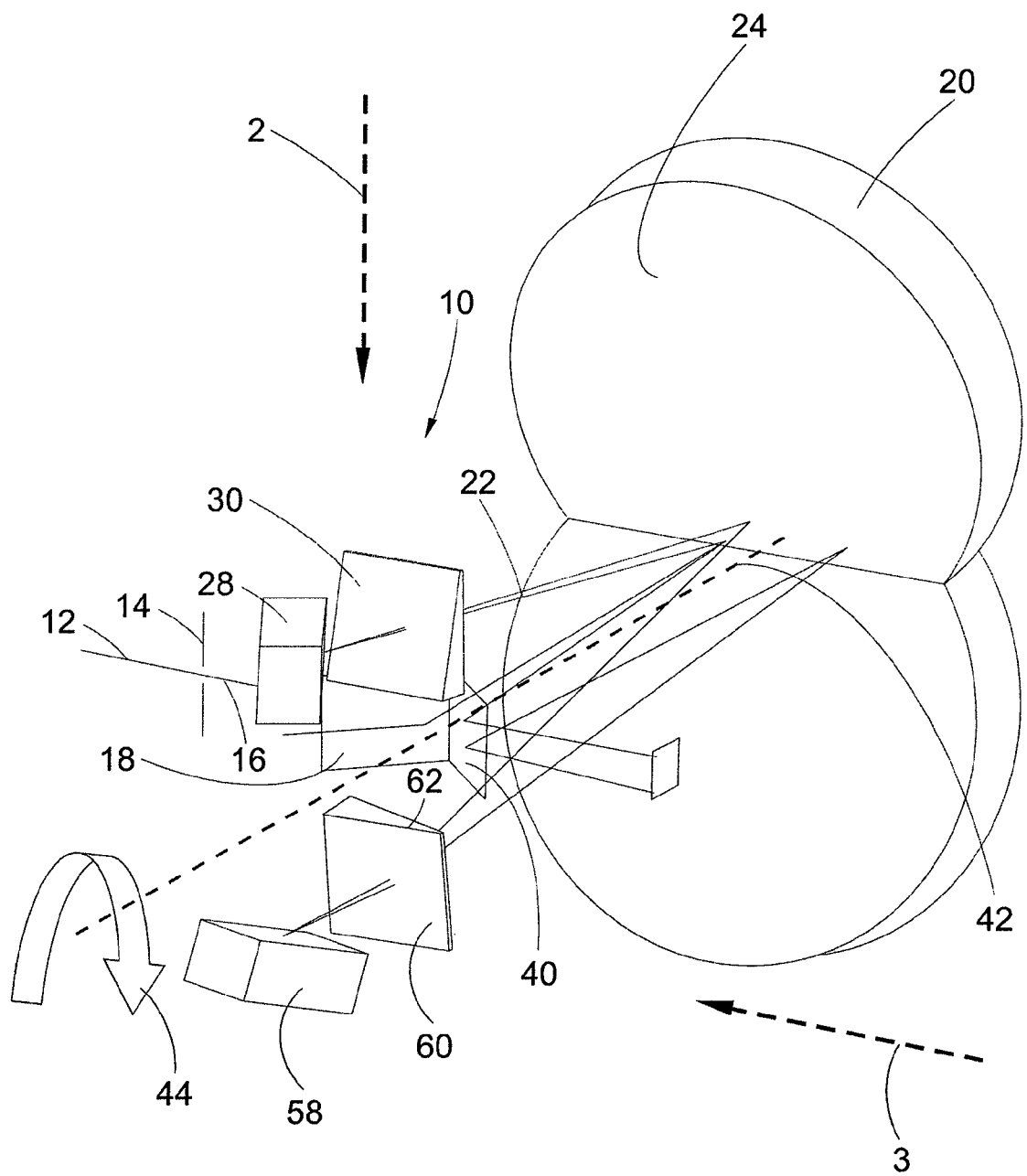
FIG. 1 is a perspective, schematic view of a double-spectrometer with a rotatable concave mirror.

In FIG. 1 the essential components of a spectrometer assembly are shown which is generally denoted with numeral 10. Essential components which, however, are not important for the invention, such as a light source, a housing, holders and electronic components are not shown in order to provide a better overview.

Light 12 from a light source which is not shown enters the spectrometer through an entrance slit 14. The light 16 is reflected in the direction of an off-axis paraboloid 20 by an angle of about 90 degrees at a plane mirror 18. The paraboloid is a collimating mirror. The divergent light 22 is parallelized by the parabolic curvature of the reflecting mirror surface 24 of the mirror 20.

Figure 3:
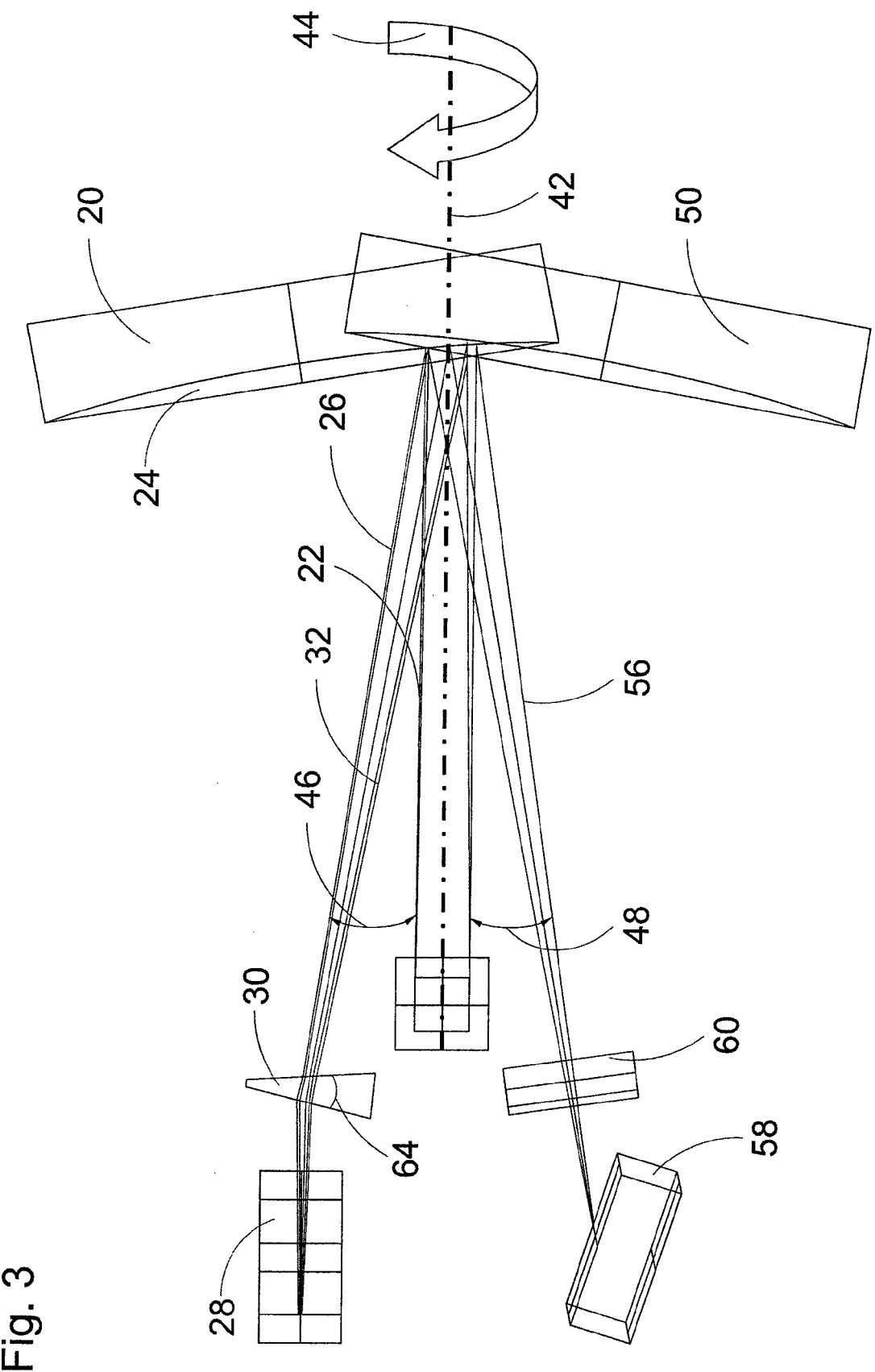
FIG. 3 is a side view of the double-spectrometer of FIGS. 1 and 2.

The off-axis paraboloid is arranged in such a way that the incident light 22 is slightly upwardly deflected. This can be seen particularly well in the side view of FIG. 3 in the direction of arrow 3. Light 26 extending upwardly is dispersed at a first Echelle grating 28 in a main dispersion direction and at a quartz prism 30 in a lateral dispersion direction perpendicular thereto. The Echelle grating 28 generates a high resolution spectrum with a plurality of orders which are "drawn apart" by the lateral dispersion at the prism 30. The grating 28 is adjusted in such a way that the dispersed beam 32 essentially returns on itself, according to the Littrow-assembly. The beam passes the prism 30 again and in such a way that it is dispersed a second time in the lateral direction.

Figure 2:
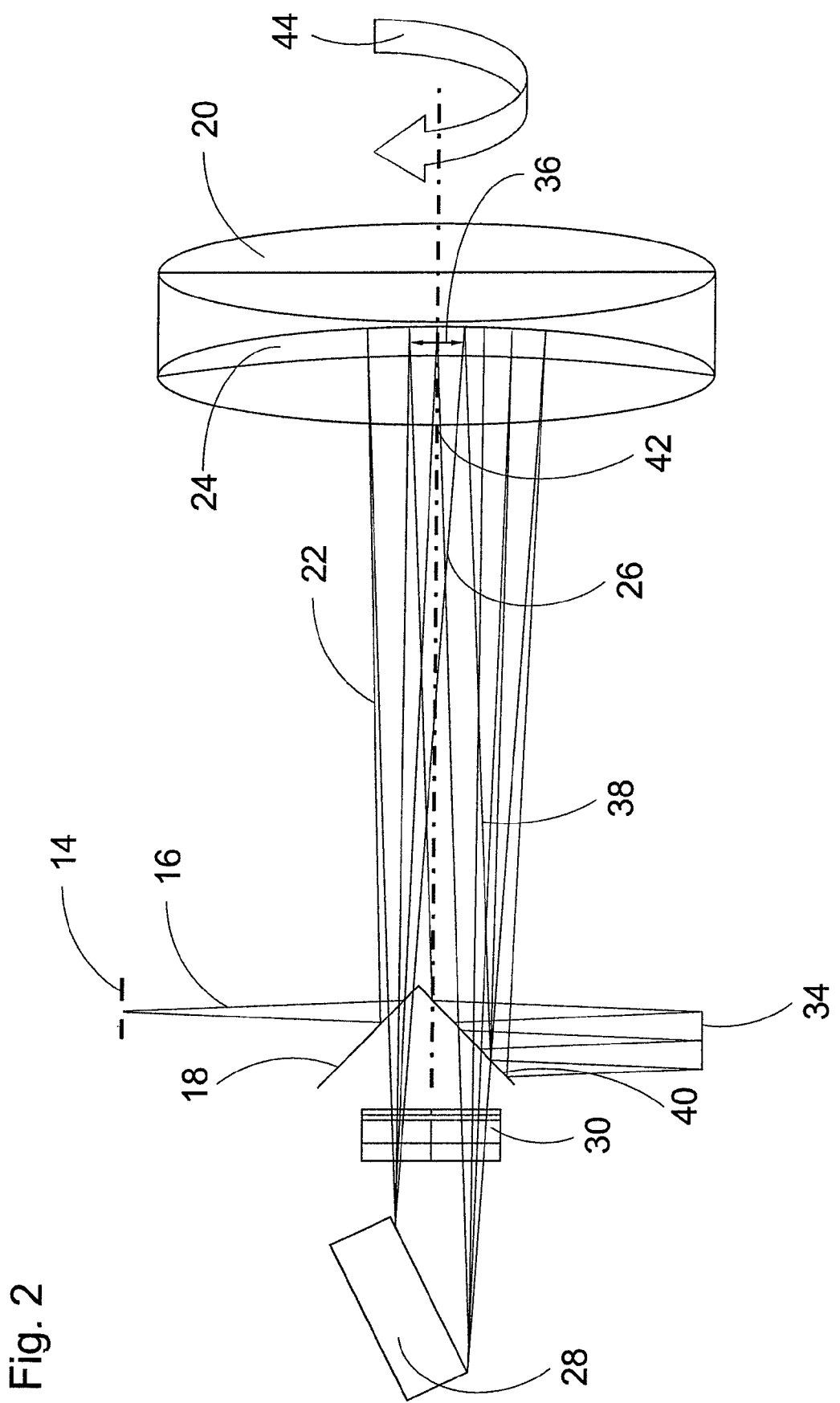
FIG. 2 is a top view of the double-spectrometer of FIG. 1.

The off-axis paraboloid 20 is arranged in the form of a Littrow-assembly and serves as a camera for the returning beam 32 for focusing the dispersed light in the exit plane 34. It can be seen in FIG. 2 that the light incident on the mirror 20 is slightly shifted by a distance 36. The dispersed light 26 is focused at the mirror 20 in an imaging plane at the detector 34. Due to the shift the focused beam 38 extends to a further plane mirror 40. The plane mirror 40 reflects this beam 38 to the detector in the imaging plane 34. The plane mirror 40 is arranged perpendicular to the plane mirror 18 and in such a way the entrance slit and the detector can be arranged opposite to each other on one axis. This can be well seen in the top view of FIG. 2 in the direction of the arrow 2.

The dispersing assembly with Echelle grating 28 and prism 30 is designed in such a way that a selected wavelength range, for example the short wavelength range between 350 nm and 190 nm falls on the detector. The dispersion of a quartz prism is relatively high in this short wavelength range. Therefore, only a small prism angle is necessary for the lateral dispersion which is sufficient to properly separate the orders in the wavelength range up to about 350 nm on the detector. The Echelle grating constant is selected such that the order at 350 nm exactly fits on the detector. Lower orders which will exceed the size of the detector with such a grating constant, do not need to be considered. The spectrum between 190 nm and 350 nm generated in such a way will therefore cover the entire detector surface. As the intensity of light sources with a continuous spectrum (such as Xe-high pressure lamps or deuterium lamps used in atomic absorption spectrometry, for example) is low, the dynamic range of the detector is adjusted such that even small intensities can still be measured.

If the wavelength range between 350 nm and 852 nm shall be measured, the off-axis paraboloid 20 is rotated about an axis 42 by 180°. This is represented by an arrow 44. The rotated off-axis paraboloid is then in a second position denoted by numeral 50. Thereby, the beam 22 is deflected downwards 52 instead of upwards 26.

The axis 42 extends through the focal point of the paraboloid and the center of its off-axis range required for the reflection of the bundles. Thereby, the axis 42 is designed in such a way that the extent of the upward deflection 46 of the beam is the same as the extent of the downward deflection 48 of the beam after the rotation.

There is a further dispersing assembly with an Echelle grating 58 and a prism 60. The prism angle 62 of the prism 60 is larger than the prism angle 64 of the prism 30, or a different prism material is used which has a higher dispersion. Radiation from the wavelength ranging between 350 nm and 852 nm is therefore dispersed in the lateral dispersion direction to a greater extent, so that the detector surface is completely used for this wavelength range as well. The grating constant of the grating 58 is smaller than the grating constant of the grating 28, whereby it is achieved that the lower orders in the wavelength ranging between 350 nm and 852 nm entirely fall on the detector. Thus, the detector area is also completely used in this direction. In the second dispersing assembly the grating and the prism are arranged in such a way that the dispersion directions on the detector are rotated by 90° relative to the dispersions directions of the first dispersing assembly. This can be seen in FIGS. 4 and 5. This alternative enhances the possibilities with non-square detector areas when the geometric set-up of the spectra are adapted to the detector area. When this wavelength range is measured the detector is read out more often in order to take into account higher intensities.

Figure 5:
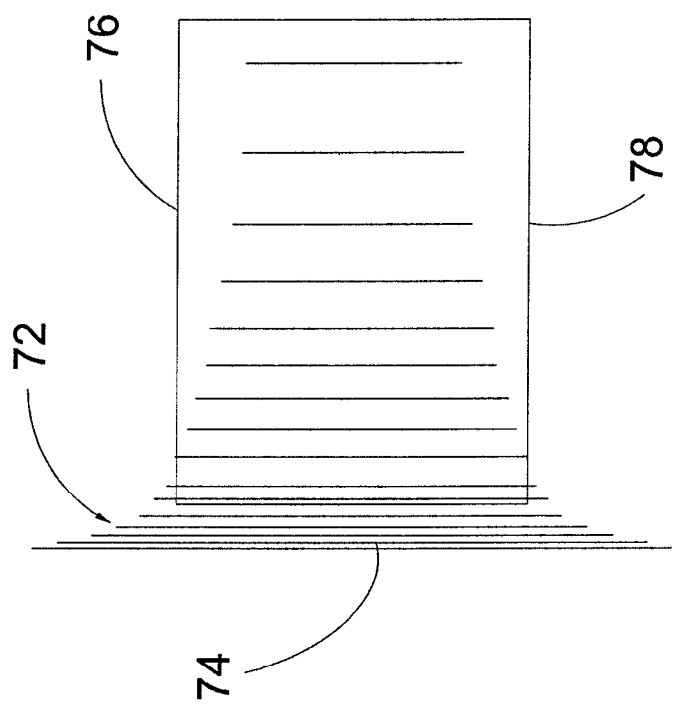
FIG. 5 illustrates the intensity distribution at the detector when a short wavelength range is measured.
Figure 4:
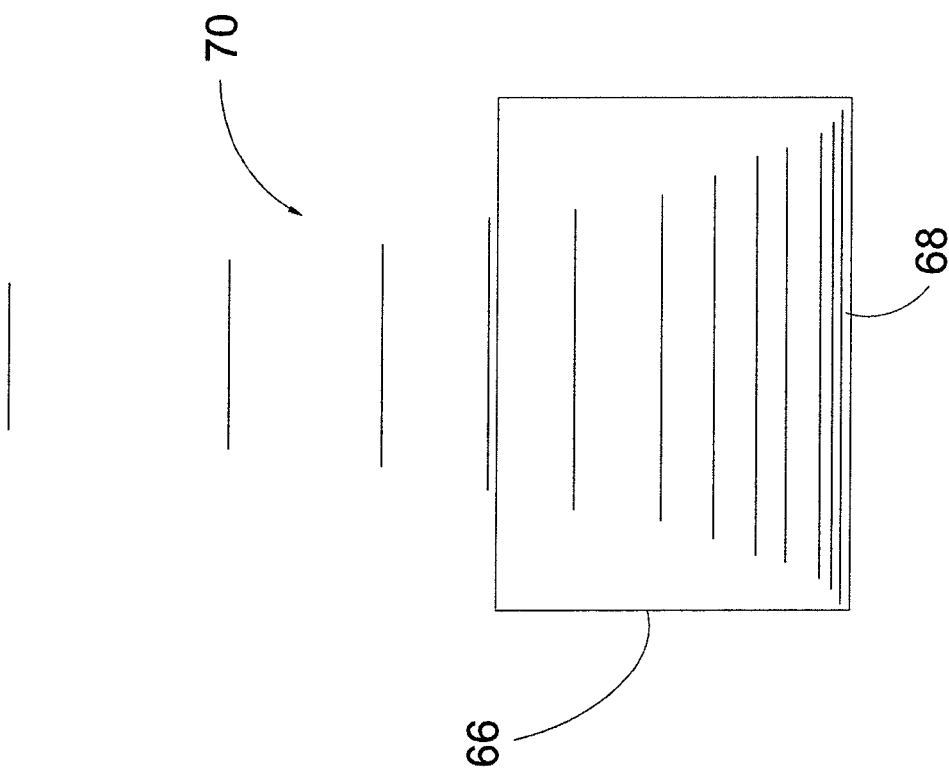
FIG. 4 illustrates the intensity distribution at the detector when a long wavelength range is measured.

The spectral intensity distribution of the two wavelength ranges on the detector is shown in FIGS. 4 and 5. FIG. 4 shows the distribution of the measured long wavelength range. It can be seen that the orders 68 completely fit onto the detector 66. Also, all orders are completely separated. The short wavelength range 70 is not detected. There, the orders are widely spread due to the high prism dispersion and relatively short due to the small grating constant. In comparison, FIG. 5 shows the long wavelength range 72 not being detected. The orders 74 extend over the edges 76 and 78 of the detector. Furthermore, these orders are not sufficiently separated. The orders of the short wavelength range, however, are close together due to the small prism dispersion. Thereby, the detector surface is used to a better degree. A larger grating constant of the Echelle grating causes longer orders and a better resolution.

Due to the smaller detector size the peripheral beams remain close to the axes with a small deviation angle. Thereby, aberration is reduced.

It can be seen from the described embodiment that two different dispersing assemblies can be illuminated with one common entrances slit, one common optical imaging assembly, and one common detector for all wavelengths by rotation of a concave mirror. By adaption of the dispersing elements expensive detector area can be optimally used. The detector is smaller and can be quicker read out. It is understood that the described embodiment is described by way of example only regarding a certain wavelength range and that different wavelength ranges may be selected depending on the application.

The described invention enables a variety of alternatives. A change between a two-dimensional dispersing assembly with an Echelle grating and a one-dimensional dispersing assembly may be useful, wherein the detector array can be used for spectral resolution as well as for geometric resolution with a long entrance slit. The change between the two dispersing assemblies may also be effected by a rotation of the deflecting mirrors 18, 34 by 180° about a vertical axis. In this case a further paraboloid on the opposite side is used. The light incident from the entrance slit is then deflected to the left side in FIG. 2 instead of the right side. There it falls on a second paraboloid deflecting the light to the second dispersing assembly.

The invention claimed is:

1. A spectrometer assembly with a spectrometer for generating a spectrum of light emitted by a light source on a detector, comprising:
    an optical imaging Littrow-assembly for imaging light entering the spectrometer assembly on an image plane;
    a first dispersing assembly for spectral dispersion of a first wavelength range of the light entering the spectrometer assembly;
    a second dispersing assembly for spectral dispersion of a second wavelength range of the light entering the spectrometer assembly; and
    a common detector in the image plane of the optical imaging assembly,
    wherein the optical imaging assembly comprises an element adapted to be moved between two positions, and the light entering the spectrometer assembly is guided through the first dispersing assembly in the first position and through the second dispersing assembly in the second position.

2. The spectrometer assembly of claim 1, wherein the optical imaging assembly comprises a concave mirror adapted to be moved from the first to the second position by rotation.

3. The spectrometer assembly of claim 2, wherein the first dispersing assembly is arranged outside of a centerline plane defined by center points of an entrance slit, the concave mirror and the detector, and wherein the second dispersing assembly is arranged on the other side of the centerline plane.

4. The spectrometer assembly of claim 2, wherein the concave mirror is an off-axis paraboloid.

5. The spectrometer assembly of claim 4, wherein the off-axis rotational axis extends through the focal point of the concave mirror and the degree of the deflecting angle between the incident and the reflected beam at one wavelength is the same in the first and the second position.

6. The spectrometer assembly of claim 1, wherein the first and/or second dispersing assembly comprises an Echelle grating having a dispersion direction, and a further dispersion element dispersing in a direction lateral to the dispersion direction of the Echelle grating.

7. The spectrometer assembly of claim 1, wherein a detector array with a two-dimensional assembly of a plurality of detector elements is arranged in the imaging plane.

8. The spectrometer assembly of claim 1, wherein the first and second dispersing assemblies comprise first and second optical elements having different optical properties optimized with respect to the first and second wavelength ranges, respectively.

9. The spectrometer assembly of claim 1, wherein the first dispersing assembly is a two-dimensional dispersing assembly with an Echelle grating and the second dispersing assembly is a one-dimensional dispersing assembly, so that both a spectral resolution and a spatial resolution can be detected at the entrance slit.

10. A method for spectrally dispersing light from a light source in a selected wavelength range comprising the steps of:
   illuminating an entrance slit of a spectrometer assembly with said light from said light source;
   imaging said light on an imaging plane by means of an imaging optical assembly in Littrow-arrangement;
   dispersing said light with a dispersing assembly, wherein said light is dispersed with a first or a second dispersing assembly depending on said wavelength range; and
   detecting said light from a selected wavelength range in said imaging plane,
   wherein an element of said imaging optical assembly adapted to be moved between two positions depending on a selected wavelength range is adjusted so that said light entering said spectrometer assembly is passed through said first dispersing assembly in said first position of said element, and through said second dispersing assembly in said second position of said element.

11. A spectrometer assembly comprising:
   a light-emitting light source, said light from said light-emitting light source having a first wavelength range and a second wavelength range;
   a detector;
   a spectrometer, said spectrometer generating a spectrum of said light emitted by said light source on said detector;
   an optical imaging Littrow-assembly for imaging said light from said light source entering said spectrometer assembly onto said detector arranged in an image plane of said Littrow-assembly;
   a first dispersing assembly for spectral dispersion of said first wavelength range of said light entering said spectrometer; and
   a second dispersing assembly for spectral dispersion of said second wavelength range of said light entering said spectrometer,
   wherein said detector is a common detector in said image plane of said optical imaging Littrow-assembly for said first and second wavelength range, and
   wherein said optical imaging Littrow-assembly comprises a concave mirror adapted to be moved between a first and a second position, wherein said light entering said spectrometer is guided through said first dispersing assembly in said first position and through said second dispersing assembly in said second position.

12. The spectrometer assembly of claim 11, wherein said concave mirror (20) is an off-axis paraboloid and wherein said off-axis paraboloid has an off-axis rotational axis and a focal point, said off-axis rotational axis (42) extending throught said focal point, where the degree (46, 48) of the deflecting angle between an incident and a reflected beam at one wavelength is the same in said first and said second position.

* * * * *